United States Patent [19]
Shelton et al.

[11] Patent Number: 6,035,380
[45] Date of Patent: Mar. 7, 2000

[54] INTEGRATED CIRCUIT

[76] Inventors: Christopher D. Shelton, 24 Copenhagen Street, London, United Kingdom, N1 0JD; Martin S. Kelly, 91 Queen Edith's Way, Cambridge, United Kingdom, CB1 4PL; William E. Orme, 39 High Street., Fen Ditton, Cambridge, United Kingdom, WG0 8ST; Marius P. M. Schilder, B. Floriszstraat 4911, Amsterdam, NL-1071, Netherlands; Niels T. Ferguson, Bart de Ligtstraat 64, Amsterdam, NL-1097, Netherlands; David Chaum, Keizersgracht 568, Amsterdam, NL-1017, Netherlands; Wolfgang Mayerwieser, Vinzenzgasse 78, A-8020, Graz, Austria; Reinhard Posch, Pachernweg 4e, Graz, A-8020, Austria; Volker Schindler, K.M.v. Webergasse 6/3, Graz, A-8042, Austria

[21] Appl. No.: 08/875,936
[22] PCT Filed: Feb. 12, 1996
[86] PCT No.: PCT/GB96/00295
   § 371 Date: Feb. 19, 1998
   § 102(e) Date: Feb. 19, 1998
[87] PCT Pub. No.: WO96/25720
   PCT Pub. Date: Aug. 22, 1996

[30] Foreign Application Priority Data

Feb. 14, 1995 [GB] United Kingdom ................... 9502864

[51] Int. Cl.⁷ .............................. G06F 9/44; G06F 9/455
[52] U.S. Cl. ......................... 711/163; 711/152; 711/151; 395/500.47
[58] Field of Search ......................... 380/4, 49; 235/379, 235/481, 380, 492; 713/200; 711/163, 155.2, 206, 152, 151; 371/57.2; 707/9; 714/6, 764; 712/227, 244, 235

[56] References Cited

U.S. PATENT DOCUMENTS

| | | | |
|---|---|---|---|
| 4,875,156 | 10/1989 | Tanagawa et al. | 713/200 |
| 4,983,816 | 1/1991 | Iijima | 235/379 |
| 5,081,675 | 1/1992 | Kittirutsunetorn | 380/4 |

FOREIGN PATENT DOCUMENTS

| | | |
|---|---|---|
| 0617387 | 9/1994 | European Pat. Off. . |
| 0636998 | 2/1995 | European Pat. Off. . |
| 0483978 | 4/1996 | European Pat. Off. . |
| 0488720 | 10/1996 | European Pat. Off. . |
| 0356237 | 2/1998 | European Pat. Off. . |
| 8802899 | 4/1988 | WIPO . |
| 9206451 | 10/1990 | WIPO . |
| WO96/25720 | 8/1996 | WIPO . |

*Primary Examiner*—Daniel H. Pan
*Attorney, Agent, or Firm*—James Creighton Wray; Meera P. Narasimhan

[57] ABSTRACT

A single chip processor for use in a smart card has a plurality of instruction memory areas and a processor. Different instructions sets are selectively executable in response to a signal defining a memory area from which instructions are supplied. Preferably instruction and data memory areas are addressable as pages, wherein a page address cannot be directly accessed by a subset of instructions. The processor may include a central processing unit and a cryptographic logic unit which operate at different times and share common instruction memory and sequencing logic. Instructions are supplied to said cryptographic logic unit at an integer multiple of the rate at which they are supplied to said central processing unit.

10 Claims, 16 Drawing Sheets

PROTECTED INSTRUCTIONS

| Mnemonic | Operation |
|---|---|
| RST | RESET |
| SETPG MS | Set page register for module space |
| GETPG MS | Get page register for module space |
| SETPG BISS | Set page register for binary interface space |
| GETPG BISS | Get page register for binary interface space |

UNPROTECTED INSTRUCTIONS

| Mnemonic | Operation |
|---|---|
| LOD #N | Load accumulator |
| ADC #N | Add to accumulator |
| SBC #N | Subtract from accumulator |
| CMP #N | Compare with accumulator |
| XOR #N | Logical Exclusive OR |
| OR #N | Logical OR |
| AND #N | Logical AND |
| RRC A | Rotate right with carry, accumulator A |
| RRC B | Rotate right with carry, accumulator B |
| RLC A | Rotate left with carry, accumulator A |
| RLC B | Rotate left with carry, accumulator B |
| NOP | No Operation (skip instruction) |

*Figure 10*

INTEGRATED CIRCUIT

The present invention relates to a single chip integrated circuit having processing means arranged to process instructions.

BACKGROUND OF THE INVENTION

Portable data carrying devices having non-volatile storage configured to store secure data are known. An international standard has been developed relating to devices of this type having a size and configuration substantially similar of that of conventional credit cards. In addition to non-volatile storage, cards of this type may also be provided with a processing facility and in this configuration they have become generally known as "smart cards".

Data stored on smart cards may be used to represent many entities and cards of this type have become particularly popular for the storage of money tokens, where data held on the cards represents negotiable money as a replacement for negotiable notes and coinage. Money transactions using the card may be effected by the use of suitable terminal equipment, for example located beside a conventional cash register. A transaction involves reducing a data value on the card, and increasing a data value at a remote location, via the terminal. Cards may hold data values representing a finite amount of money. Transactions may also involve incrementing a money token on the card, while reducing a money token at a remote location, thereby increasing the amount of money represented on the card.

An IC card including a processor, a first memory for storing a system programme and a second memory for storing an application programme is disclosed in European patent publication No 0356257. A third memory is provided for storing data process by the processor and an input\output unit is provided for effecting input and output operations of programmes and data Device includes a programmes stop section for stopping the programme being executed on the processor at a specified address and a data output section for supplying the input\output unit with either one of a content of a register in the processor and the content of an area of an address of at least one of the first, second or third memories and the programme running on the processor is stopped.

Equipment may also be provided to transfer money directly from one card to another. Money transactions involve reducing a data count on one card while effecting a similar data increment on a cooperating card. Thus, in this way, the data held on both cards subsequent to a transaction taking place is consistent with a particular sum of money being transferred from one to the other.

A variety of financial transactions may therefore be effected by the use of smart cards, and over a variety of terminal equipment from a diverse range of shopping outlets and financial service providers. It is essential that an extremely high level of security is provided during such transactions, in order to avoid the possibility of electronic counterfeiting or other mischief.

A high security IC card is disclosed in European patent publication No 0636998. The IC card has a read only memory for storing an operation command and re-loadable memory for storing a plurality of control commands. A selecting unit selects control commands stored in the read only memory and one of the control commands stored in the re-loadable memory. The control unit for driving the IC card in accordance with the selected control commands is provided and the card provides high security such that it is capable of holding confidentiality of various commands. The card can be realised in a form which is adaptable to various application systems used for the IC card without re-writing the date in the read only memory and can provide high general versatility.

This requirement for high security places a limitation on the functionality of a smart card. In order for approval of its use by a financial institutions or a governing authority, the operations of the smart card must be shown to conform to a number of established highly secure protocols. Smart card functionality is therefore restricted at the time of manufacture in order to gain acceptance for its widespread use in the sensitive area of financial transactions. Thus, in known smart card systems, it is necessary to anticipate the precise functional requirements of a particular smart card before manufacture and distribution can commence.

These functional requirements include the definition of highly secure protocols. It has been shown that, given sufficient organisation of computing resources on a world wide scale, it is possible to crack at least one of the currently established highly secure protocols. With the exponential trend in the availability of computing power, it becomes increasingly difficult to define a particular set of secure protocols which will remain unbreakable over a period of time. Thus, it has become accepted that at one time or another, an established security protocol may be broken, particularly because future technological trends are impossible to predict with certainty, even over a period of a few years.

Given these difficulties, existing smart cards leave open the possibility that an entire financial transaction structure may be undermined by a single unforeseeable change in the amount of computing power available to a determined individual.

In order to reduce the likelihood of this occurring, secure protocols are continuously reviewed and developed. By having the freedom to update and change secure protocols whenever necessary, financial institutions and other security conscious agencies can stay one step ahead of those trying to steal their information, or at least minimise the amount of damage which may be done when such an event has been discovered.

With existing highly secure smart cards, it is dangerous to transfer new instructions to the card after the card has been manufactured. This is because the instructions defines the full functionality of the card, and it may be impossible to prevent illegal instructions from being transferred to a smart card, which may then be used in an unauthorised manner to gain access to money or information for which the user of the card has no right of access. Thus, when a bank requires a change in the security protocol operating with an existing smart card, it is necessary to throw away the existing card and replace it with a completely new one.

Smart cards may contain a very useful computational resource, which may be used for other applications in addition to purely financial transactions. Such applications may include the use of cards for recreational purposes such as the playing of games. Systems have been developed in which cards are used within a game playing device arranged to derive games from the card while allowing users' scores to be retained securely within the card. Furthermore, given a level of processing facility within the card, as is known within established smart cards, it is possible for third party instructions to be executed by the card thereby significantly enhancing the card's functionality.

Thus, it would be possible to manufacture cards that are suitable for new applications developed in the future given that the entire functionality of a particular application would be embodied within newly created third party instructions. The card would provide a new computing platform allowing developers to produce new applications without requiring modification to fixed smart card instructions. However, receiving third party executable instructions, possibly during an interactive operation, is not possible within existing smart cards which are used for financial or other secure transactions, given the requirement for a highly secure protocol.

SUMMARY OF THE INVENTION

According to a first aspect of the present invention, there is provided a single chip integrated circuit having processing means arranged to process instructions supplied from storage means, characterised in that said storage means comprises a first storage region and a second storage region; instructions are selectively supplied to said processing means from said storage regions; and enabling means are arranged to enable said processing means to be responsive to privileged instructions if said instructions are received from said first storage region, and to disable said processing means from being responsive to said privileged instructions if said instructions are received from said second storage region.

In a preferred embodiment, the single chip is incapsulated in a smart card and said second instruction storage region is configurable to receive instructions from a smart card terminal.

Preferably, a paged addressing means is included, arranged to supply addresses to an instruction storage region, wherein said paged addressing means is changeable only by protected instructions supplied from said first storage region.

In a preferred embodiment, the circuit has a plurality of processing means wherein said first storage region includes multi-plexing means arranged to select destination processing means for instructions. A first destination processing means maybe arranged to receive and decode instructions from said first storage region at a first instruction rate and a second destination processing means maybe arranged to receive and decode instructions from said first storage region at a second instruction rate.

According to a second aspect of the present invention, there is provided a method of processing instructions read from storage means, characterised in that said storage means comprises of a first storage region and a second storage region; instructions are selectively supplied to said processing means from said storage regions; and enabling means are arranged to enable said processing means to be responsive to privileged instructions if said instructions are received from said first storage region, and said enabling means are arranged to disable said processing means from being responsive to said privileged instructions if said instructions are received from said second storage region.

In a preferred embodiment, the processing means is a cryptographic processing means.

DESCRIPTION OF THE DRAWINGS

FIG. 7b details connections to the selective instruction decoder shown in FIG. 7a;

FIG. 8 details contents of the privileged instruction memory and the non-volatile instruction memory shown in FIG. 7a;

FIG. 9b details the exception handling procedure shown in FIG. 9a;

FIG. 10 lists protected and unprotected instructions which are decidable by the selective instruction decoder shown in FIG. 7a;

THE PREFERRED EMBODIMENT

The invention will now be described by way of example only with reference to the accompanying drawings identified above.

Figure 1:
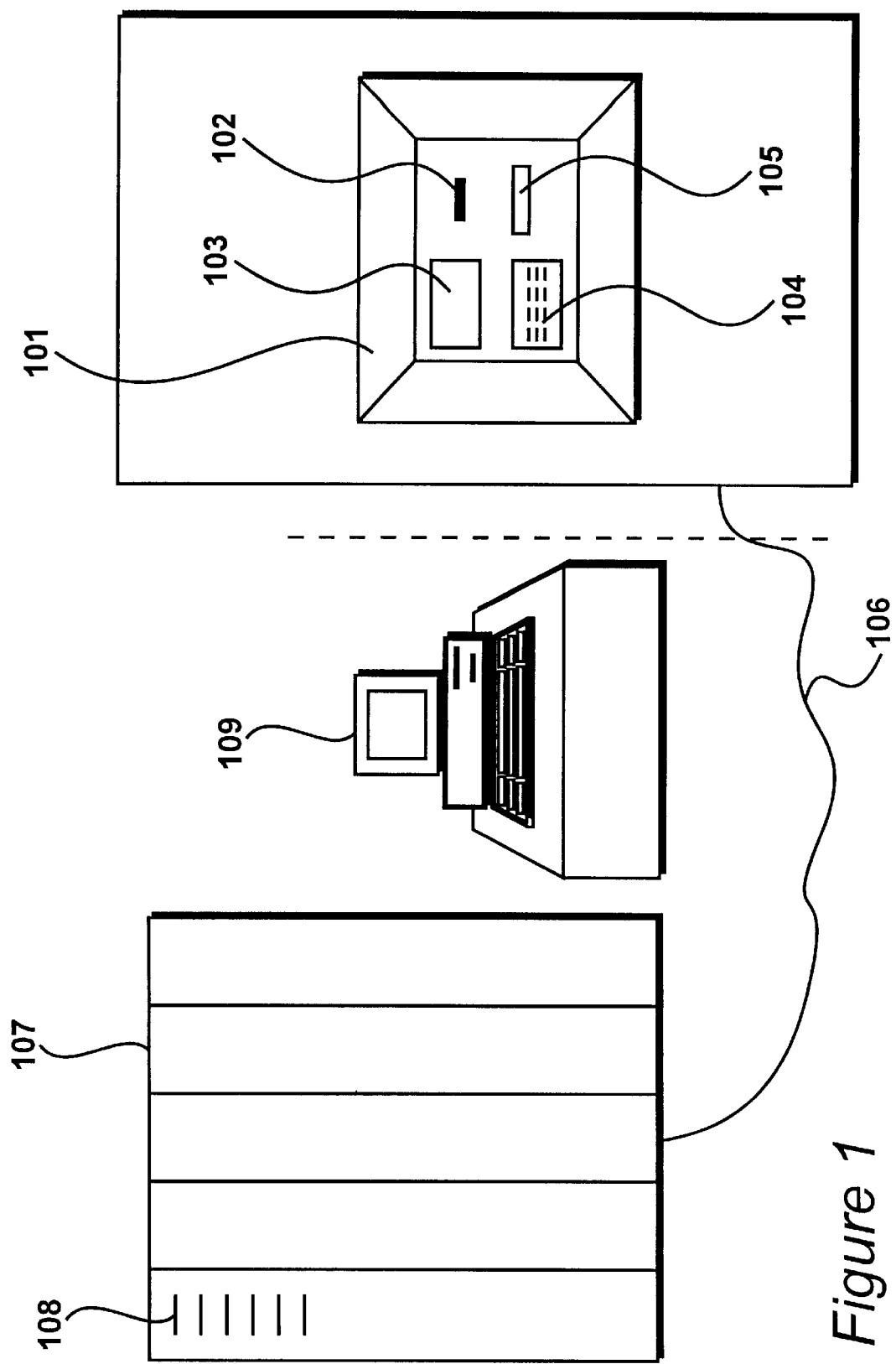
FIG. 1 shows a smart card terminal, a communications link and a mainframe computer.

A terminal for allowing smart card transactions is shown in FIG. 1. The terminal 101 includes a slot 102 for receiving a smart card, a visual display unit 103 for providing the smart card user with options and instructions for use. The user of the smart card responds to displayed options and instructions by pressing buttons 104, which are arranged to enable the user to provide numerical and functional input data. A cash slot 105 is provided in the event that the user should wish to translate money represented by data stored on the smart card into conventional cash.

The smart card terminal 101 communicates with a large computer 107 via a communications link 106. The computer 107 includes a large amount of data storage capacity in the form of arrays of hard disk drives 108. A computer terminal 109 enables an operator of the computer 107 to control access provided to smart card users via the smart card terminal 101. For example, if a smart card is stolen, a computer operator may instruct the computer 107 not to authorise any subsequent transfer of money to the card from the owner's account.

Smart cards may be used to exchange money tokens using appropriate equipment, such as that shown in FIG. 1. Alternatively, a smaller terminal may be located alongside a supermarket checkout counter, so that a smart card may be used instead of cash. Thus, when paying for goods, the amount of money stored on the smart card is reduced. The terminal shown in FIG. 1 may be used to transfer money from the user's account, into the smart card. In this way, the same smart card may be discharged and recharged with amounts of cash, at the user's convenience.

Figure 2:
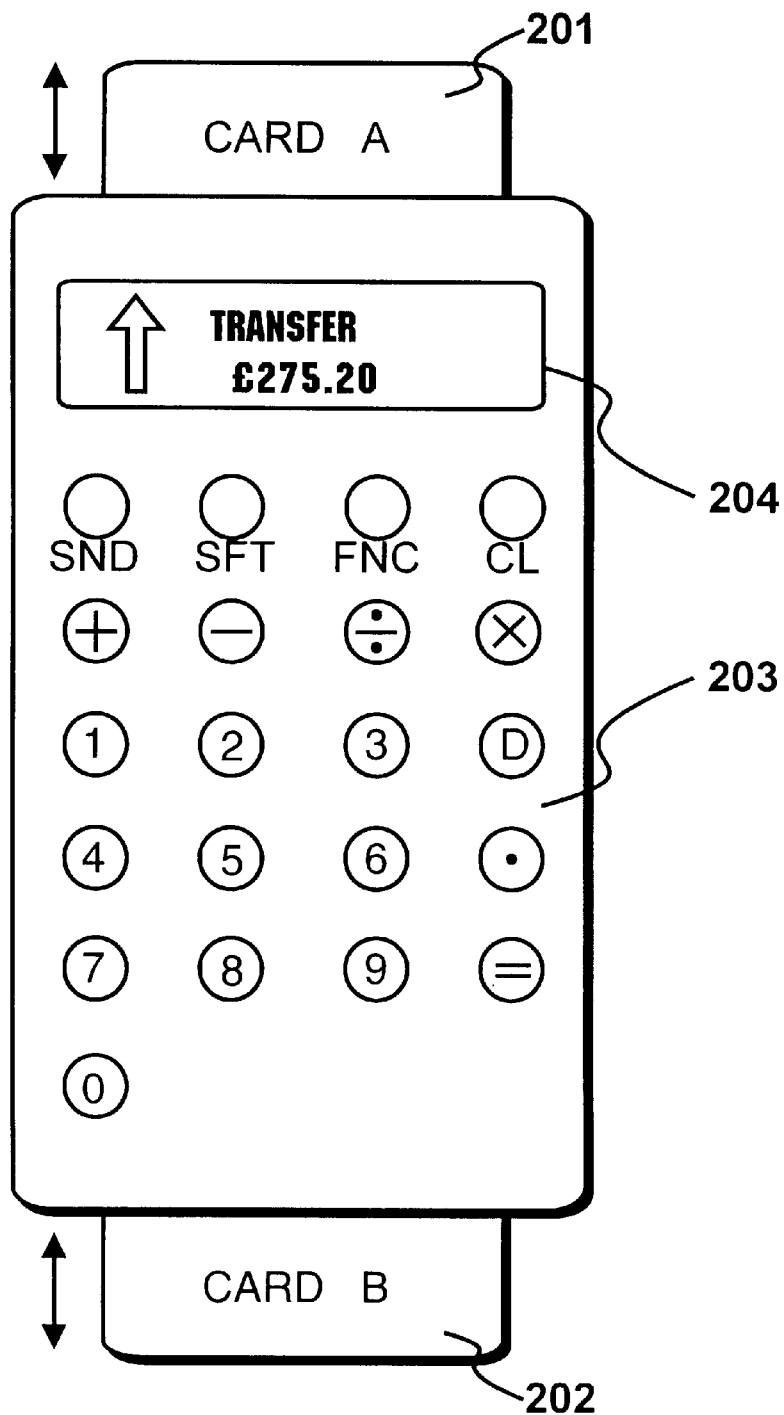
FIG. 2 shows a portable smart card transaction device, including two smart cards.

Money may be exchanged directly from one smart card to another using the portable exchange device shown in FIG. 2. The portable hand held exchange device is arranged to receive a first smart card 201 and a second smart card 202. The device includes a keyboard 203 and a display device 204, providing a user interface to allow smart card users to insert their cards into the device and to specify an amount of financial token data to be exchanged between the smart cards, along with an indication of the direction of exchange. In addition, the device may also be used by the respective parties to the transaction for them to enter their personal identification numbers, as may be required in order to authorise a transaction between cards 201 and 202.

Devices are also available for effecting transactions of this type over networks, allowing an immediate exchange of funds to be made without the physical transfer of notes or coinage etc. Networks may be insecure, such as the Internet. However, appropriate cryptographic techniques, such as public key signature authentication, may be used to facilitate secure transfer of funds nevertheless.

Figure 3:
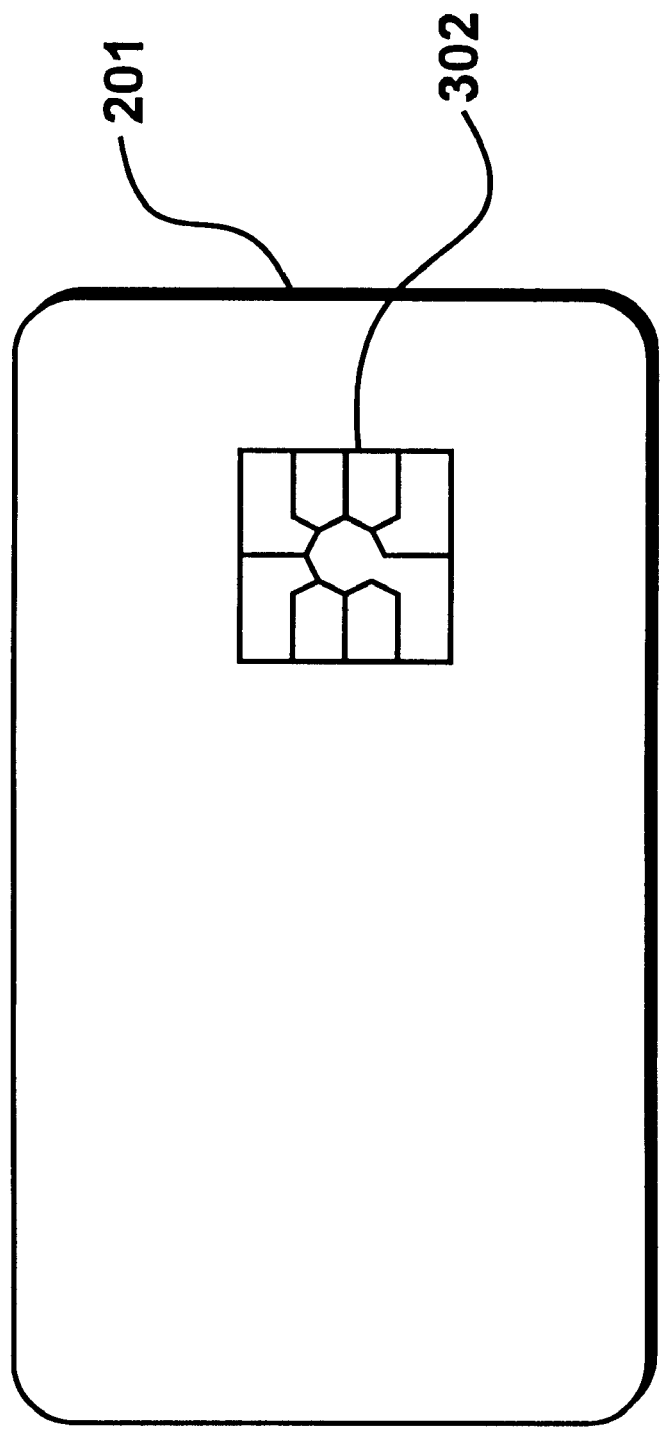
FIG. 3 details a smart card of the type shown in FIG. 2, and compatible with the smart card terminal shown in FIG. 1.

The structure of the smart card 201 shown in FIG. 2 is detailed in FIG. 3. The smart card 201 has physical dimensions substantially similar to a conventional. credit card. The card is relatively flexible and the circuitry within the card is constructed so as to be resilient to modest degrees of flexing.

The card 201 includes communication terminals 302 allowing communication with external devices. In particular, these terminals include a terminal for receiving a two point seven to five point five volt power supply, a ground connection, a clock and a reset connection. These communication terminals 302 consists of flat, gold-plated areas of metal, which are fabricated in accordance with an international standard for smart cards. Thus cards may be interchangeable and facilitate data transfer in accordance with established protocols.

The communication terminals 302 are electrically and bonded on the reverse side single silicon chip which is embedded within the smart card substrate. Only the communication terminals 302 are actually visible on the surface of the smart card, with the rest of the surface typically used for the cardholder's identity, and a company logo.

The smart card is constructed in such a way that a degree of flexing of the card is permissible, without any damage being done to the circuit. The use of a single silicon chip 303, on which all circuitry resides, concentrates important functionality into a small square area This contributes to the physical resilience of the smart card. Importantly, the area of silicon which is used for the chip must be minimised in order to reduce the cost of manufacture, and furthermore to decrease the likelihood of chip failure in the field, which is itself related to the area occupied by silicon circuitry.

Figure 4:
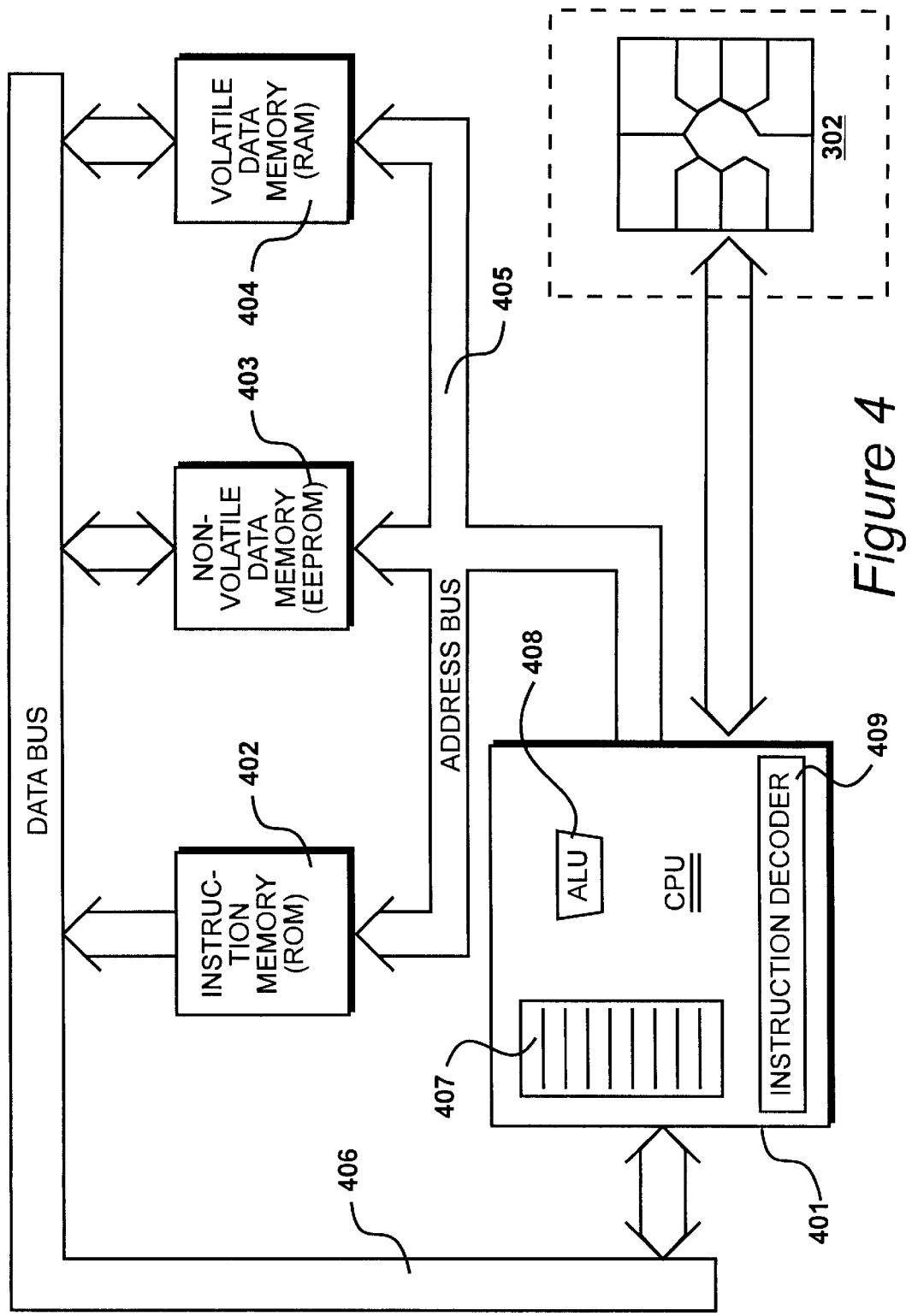
FIG. 4 details a known design for a silicon chip in a conventional smart card, including an instruction memory area and a central processing unit.

A block diagram of known circuitry which is integrated onto the smart card chip is shown in FIG. 4. A central processing unit (CPU) 409 is connected to the communications terminals 302 of the smart card. The central processing unit 401 is also connected to three areas of memory. The instruction memory 402 contains permanent unchangeable patterns of data in the form of a read only memory (ROM). These patterns of data are arranged in groups of eight bits, forming a byte.

When the smart card is operating, the central processing unit 401 automatically supplies a sequence of memory addresses to the instruction memory 402 over an address bus 405. In a typical smart card, the address bus represents twelve individual address bits, allowing addressing of up to four thousand and ninety-six different memory locations. In response, the instruction memory 402 supplies a byte from each sequentially addressed location back to the central processing unit 401, where they are decoded as instructions by an instruction decoder 409. The instruction decoder coordinates operations within the central processing unit 401, such that useful calculations may be performed between registers 407 and an arithmetic and logic unit (ALU) 408. The instruction decoder 409 may also modify the sequence of addresses supplied to the instruction memory 402, thus permitting a jump to a different sequence of instructions held therein. This jump may be conditional upon the result of a calculation performed by the arithmetic and logic unit 401.

In order to make use of larger amounts of data than can be held in the registers 407, the address bus 405 can also supply addresses to a non-volatile data memory 403 and a volatile data memory 404. The non-volatile data memory 403 is fabricated in a technology known as electrically erasable programmable read only memory (EEPROM), in which a memory location is set or cleared by a process of hot electron injection or Fowler-Nordheim tunnelling respectively, as is known in the art. Modifying data stored in the non-volatile data area 403 may take several milliseconds, whereas reading a byte of data is typically achieved in less than two hundred and fifty hundred nanoseconds. Other non-volatile memory technologies may be used, such as Ferro-electric random access memory (FRAM).

The non-volatile data memory 403 is used to store changeable customer data, such as the amount of money stored by the card, and customer specific data, such as the customer's account number. Both these types of information may be encrypted, and require a pair of decryption keys, stored in the non-volatile data memory 403, to be supplied either manually or electronically from some external source, whenever a transaction is required.

The volatile data memory 404 is fabricated as a matrix of random access memory (RAM) cells. This retains its contents only for as long as the smart card has a power supply, and therefore loses its contents when the smart card is removed from the transaction slot 102. A location in the volatile data memory 404 may be written to or read from at a high speed, typically in less than two hundred and fifty nanoseconds. This area of memory is used for storing intermediate results from complex calculations, for example those which are performed during data encryption or decryption.

The data supplied by the non-volatile memory 403 or the volatile memory 404 to the data bus 406 is not interpreted as an instruction by the instruction decoder 409, and is instead supplied to one of the registers 407. Thereafter calculations may be performed on the data, and results returned to one of the data memories 403 or 404, by placing an appropriate address on the address bus 405, supplying a write signal to the respective memory area and supplying the data to the data bus 406 for the period of time required by the memory for a write cycle to be performed. The write cycle time may be five milliseconds for the non-volatile data memory 403, or a couple of hundred nanoseconds for the volatile data memory 404.

Figure 5:
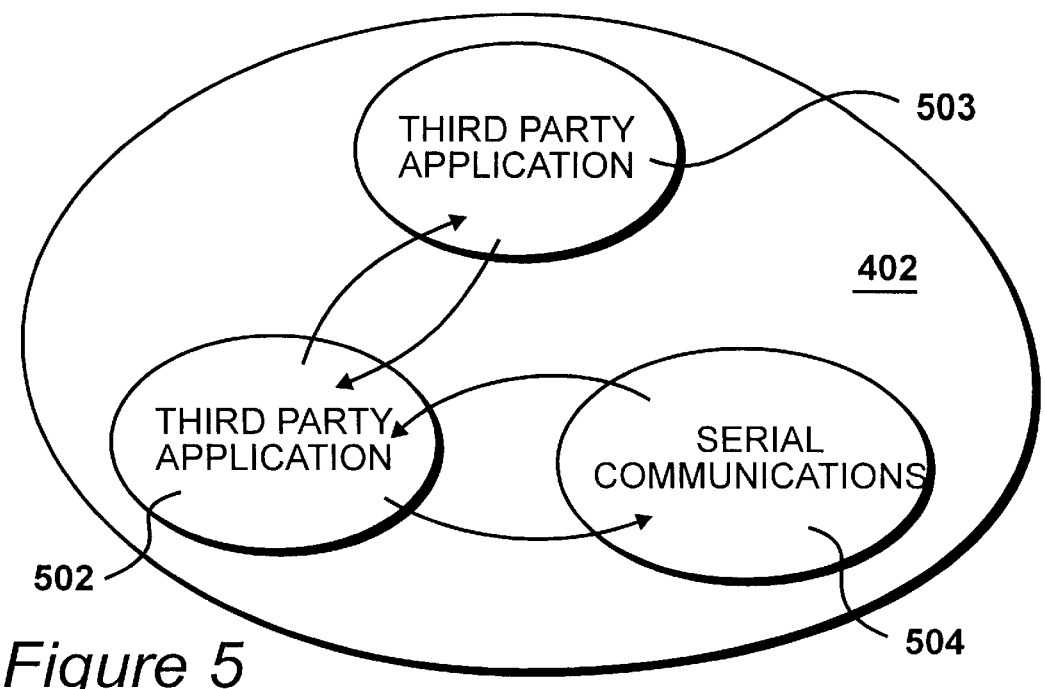
FIG. 5 details instruction sequences stored in the instruction memory area shown in FIG. 4.

A representation of instructions contained in the instruction memory 402 is shown in FIG. 5. An operating system contains a number of subroutines, such as multiplication, division, and possibly certain types of encryption algorithm, such as the Data Encryption Standard (DES). A third party application 503, also stored in the same instruction memory 402, makes use of the subroutines provided by the operating system 502. The operating system also communicates with instructions for serial communications 504, which provide the ability to transfer information to and from the outside world via the smart card terminals 302.

Figure 6:
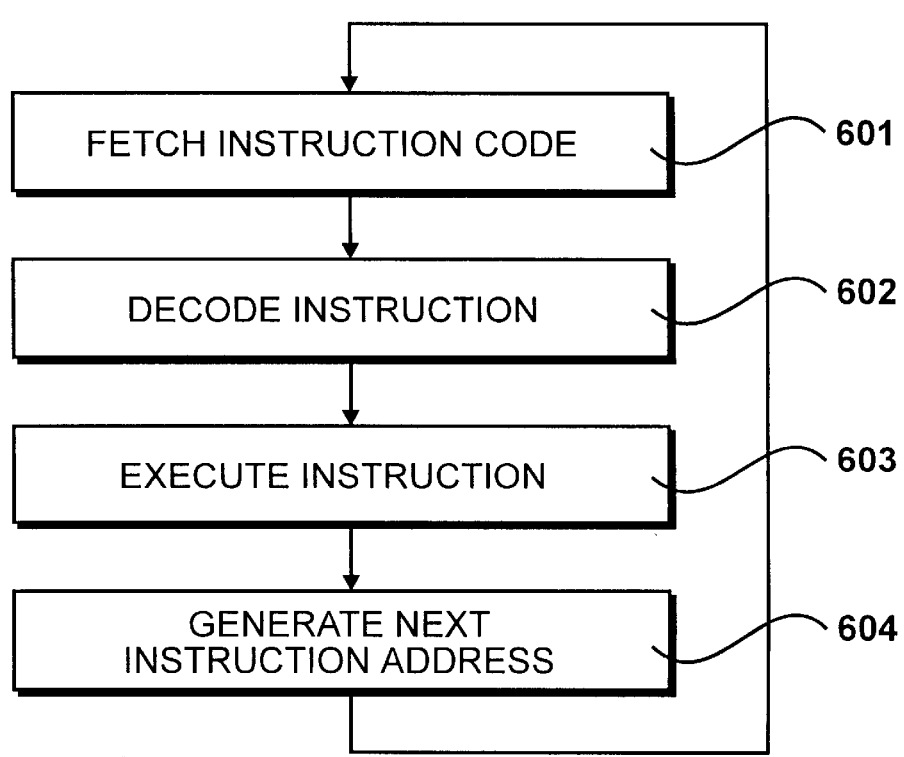
FIG. 6 details the instruction fetch and decode sequence as performed by the central processing unit shown in FIG. 4.

The basic operations performed by the instruction decoder 409 in a smart card chip are summarised in the flow chart shown in FIG. 6. In process 601, an instruction code is fetched from the instruction memory 402, by supplying an appropriate address on the address bus 405, and then transferring data from the data bus 406 to the instruction decoder 409. At process 602, the instruction is decoded. Typically, this includes accessing a small read only memory in the instruction decoder, which has a large number of output data lines, which are then supplied, via a pipeline register, to control the various electronic components that comprise the rest of the central processing unit 401.

In process 603, the decoded instruction supplied to the pipeline register in the instruction decoder, is actively supplied to the rest of the central processing unit circuitry, thus executing the instruction. At process 604, the address of the next instruction in the instruction memory is calculated, usually by adding one to the previous value. Thereafter, processes 601 to 604 are repeated indefinitely, thus enabling sequences of instructions to be executed.

It should be noted that instructions are decoded, regardless of the sequence and hence functionality of which they form a part. In this important respect, the central processing unit 401 cannot distinguish between instruction sequences provided from different sources, i.e third parties 503, or instructions which form part of the operating system 502. Thus, it is theoretically possible for instructions to be written which simulate the operations of known third party instructions, but which are modified, for example, in order to illegally increase the value of money stored by the card.

Since money is represented by a pattern of electrical charge on a silicon chip, the amount which might be stolen has no physical limit. In this type of theft, the money on the card would be increased, while the amount in a bank account would remain the same, and the theft may remain undetected for this reason. There are several techniques for ensuring that such tampering will be extremely difficult to achieve, for example by extensive use of signature authentication by public key cryptography, as is known. However, the only sure way to prevent this type of fraud is to make it impossible to modify instructions held in the instruction memory 402.

Another problem occurs when multiple applications share the same smart card instruction memory. Certification is then required to ensure that instructions from different applications do not attempt any form of unauthorised access. This certification is extremely difficult, and therefore effectively rules out the use of flexible down-loadable instructions after the card has been manufactured.

Figure 7A:
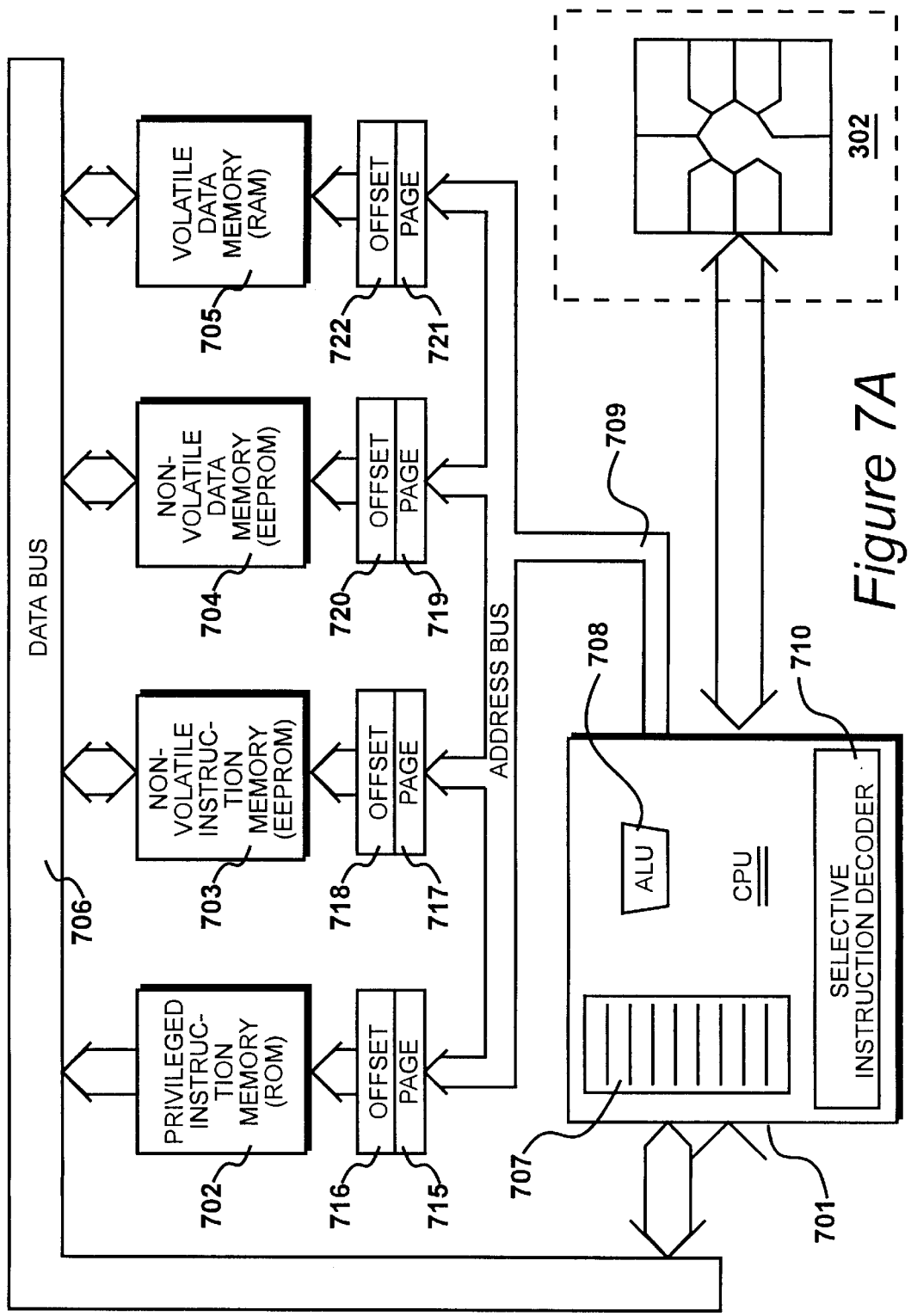
FIG. 7a details an improved design for a silicon chip in a smart card, including a privileged instruction memory, a non-volatile instruction memory and a central processing unit having a selective instruction decoder.

For this reason, known smart card chips holding multiple applications which are used for secure financial transactions have instructions stored only in read only memory. Thus, it will be known at the time the card is distributed that application instructions are compatible and will not attempt to interfere with each other. This, however, places a restriction on the functionality of the smart card, which must therefore be entirely defined before it is distributed for use. Furthermore, should a bank or other financial institution wish to update security procedures in use on their smart cards, existing cards must be replaced, involving considerable cost An improved memory arrangement for a smart card chip is shown in FIG. 7a. Instructions may be supplied from a privileged instruction memory 702, which is a read only memory area, or from a non-volatile instruction memory 703, which is an electrically erasable read only memory.

A page register 715 defines the most significant eight bits of the address supplied to the privileged instruction memory 702, and an offset register defines the least significant eight bits of the address supplied to the privileged instruction memory 702.

In normal operation, the offset register 716 or the offset register 718 increments automatically each time an instruction is fetched. Thus, the address bus 709 is only required to define the contents of the page register 715 or the offset register 716, when a jump to a different set of instructions is required.

The privileged instruction memory 702 is a read only memory area, whose contents are defined before the card is manufactured and distributed. The non-volatile instruction memory 703 may have its contents changed after the card has been distributed. For example, instructions may be updated during an interactive session with the terminal 101 shown in FIG. 1, with new instructions supplied from the large computer 107 at a remote site. The central processing unit 701, shown in FIG. 7a, includes a selective instruction decoder 710. The central processing unit has a number of possible instructions, which are referred to as an instruction set. The selective instruction decoder 710 only allows the full set of instructions to be executed from the privileged instruction memory 702. Certain instructions, particularly those which modify or read any of the page registers 715, 717, 719 or 721, are prevented from being used when they are supplied from the non-volatile instruction memory 703. The central processing unit 701 shown in FIG. 7a is further detailed in FIG. 7b. An instruction source controller 751 selects the instruction memory from which the sequence of instructions is fetched. A control line 752 controls circuits to select instructions from the privileged instruction memory 702, and a second control line 753 controls circuits to select instructions from the non-volatile instruction memory 703. The control line 752 for selecting the privileged instruction memory 702 is also supplied to the selective instruction decoder 710. Selecting circuits therein enable the full set of instructions for the central processing unit 701 to be accessed when the control line 752 is activated.

Figure 8:
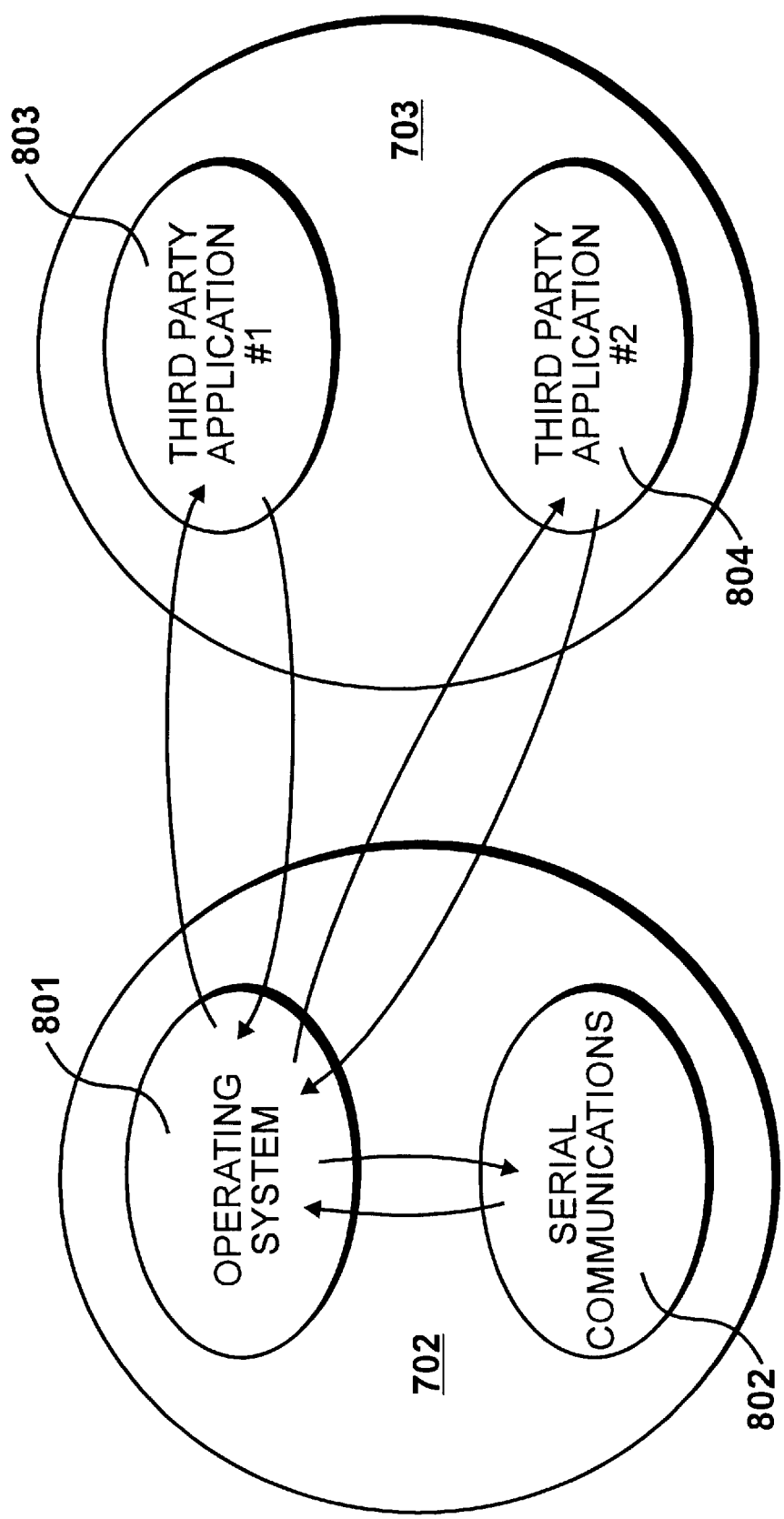

A representation of instructions stored in the two instruction memory areas 702 and 703 shown in FIG. 7a, is shown in FIG. 8. Operating system instructions 801 and serial communications instructions 802 are stored in read only memory in the privileged instruction memory 702. Only these instructions have full access to the instruction set, and hence the ability to change the contents of any of the page registers 715, 717, 719 and 721. Third party applications 803 and 804, which may have been received through a transfer at the terminal 101, are unable to access the full instruction set, because they are stored in the non-volatile memory 703.

By preventing a third party application from changing a page register, or jump to an instruction in another memory area, privileged instructions may control the type of operations performed by third party applications. For example: if third party application 803 is stored in a portion or page of non-volatile instruction memory 703 indexed by a particular page register value, it cannot directly read or jump to an instruction in third party application 804, which is stored in a different page of non-volatile instruction memory 703. Furthermore, page registers 719 and 721 shown in FIG. 7a cannot be directly modified by a third party application.

Thus a third party application is restricted to accessing data or instructions in a particular page of memory. If an application legitimately requires access to memory in a different page to that which has been allocated, this may be done, but only after arbitration by an exception handling subroutine which is executed automatically from the privileged instruction memory 702, whenever an attempt is made to use a privileged instruction from the non-volatile instruction memory 703.

Figure 7B:
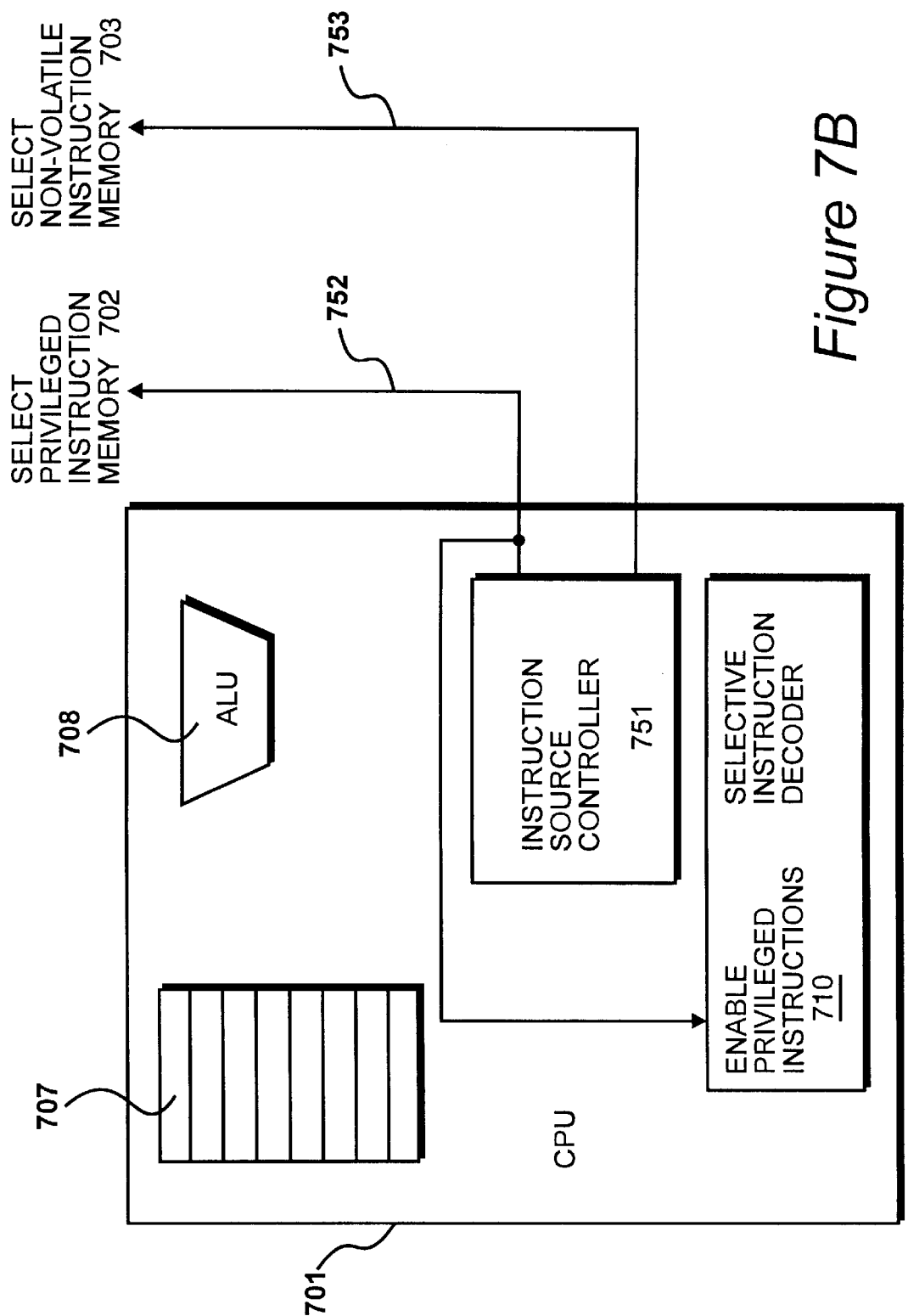
Figure 9A:
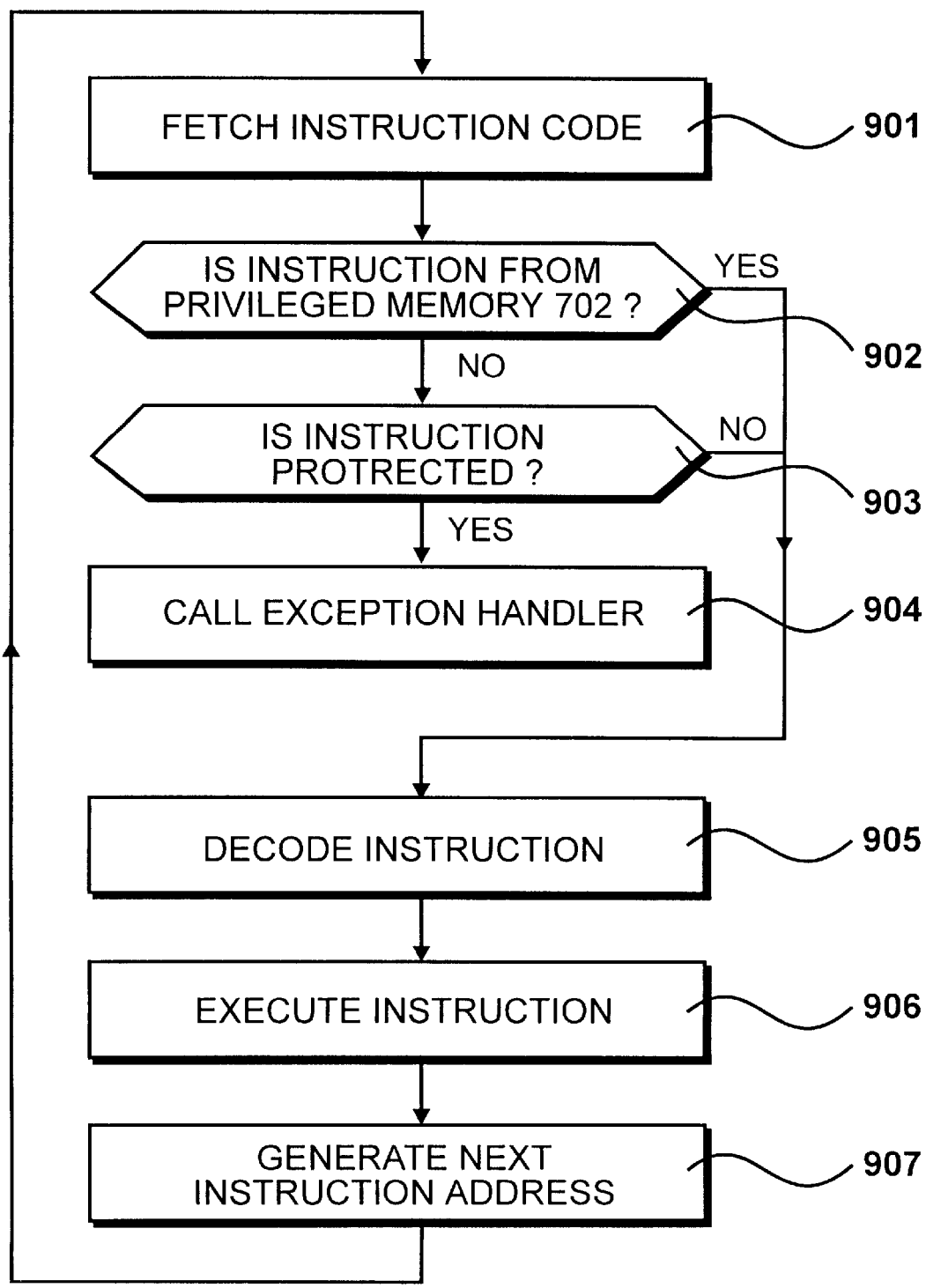
FIG. 9a details the instruction fetch and decode cycle as performed by hardware in the central processing unit shown in FIG. 7a, including calling an exception handling procedure.

The operations performed by the hardware of the central processing unit 701 when fetching instructions are summarized as a flow chart in FIG. 9a. In process 901 an instruction is fetched from either instruction memory area 702 or 703. In process 902, a question is asked as to whether the fetched instruction is from the privileged memory area 702. This question process is performed in hardware terms by controlling decoding circuitry by the control line 752 as shown in FIG. 7b. If the instruction is from the privileged instruction memory 702, control is directed to process 905. Thereafter the instruction is decoded, and executed in process 906. In process 907 the next address is generated, which is a hardware operation performed either in the offset and page registers of the respective instruction memory area, or alternatively, if a jump is to be performed, in conjunction with other circuitry on the chip.

In process 903 it is known that the present instruction has been supplied from the non-volatile instruction memory 703. A question is therefore asked, again performed by hardware circuits, as to whether the instruction is protected or not. If the instruction is not protected, control is directed to process 905. Alternatively control is directed to process 904, which results in a special sequence of events in hardware and in terms of supplied instructions, which are together referred to herein as an exception.

Figure 9B:
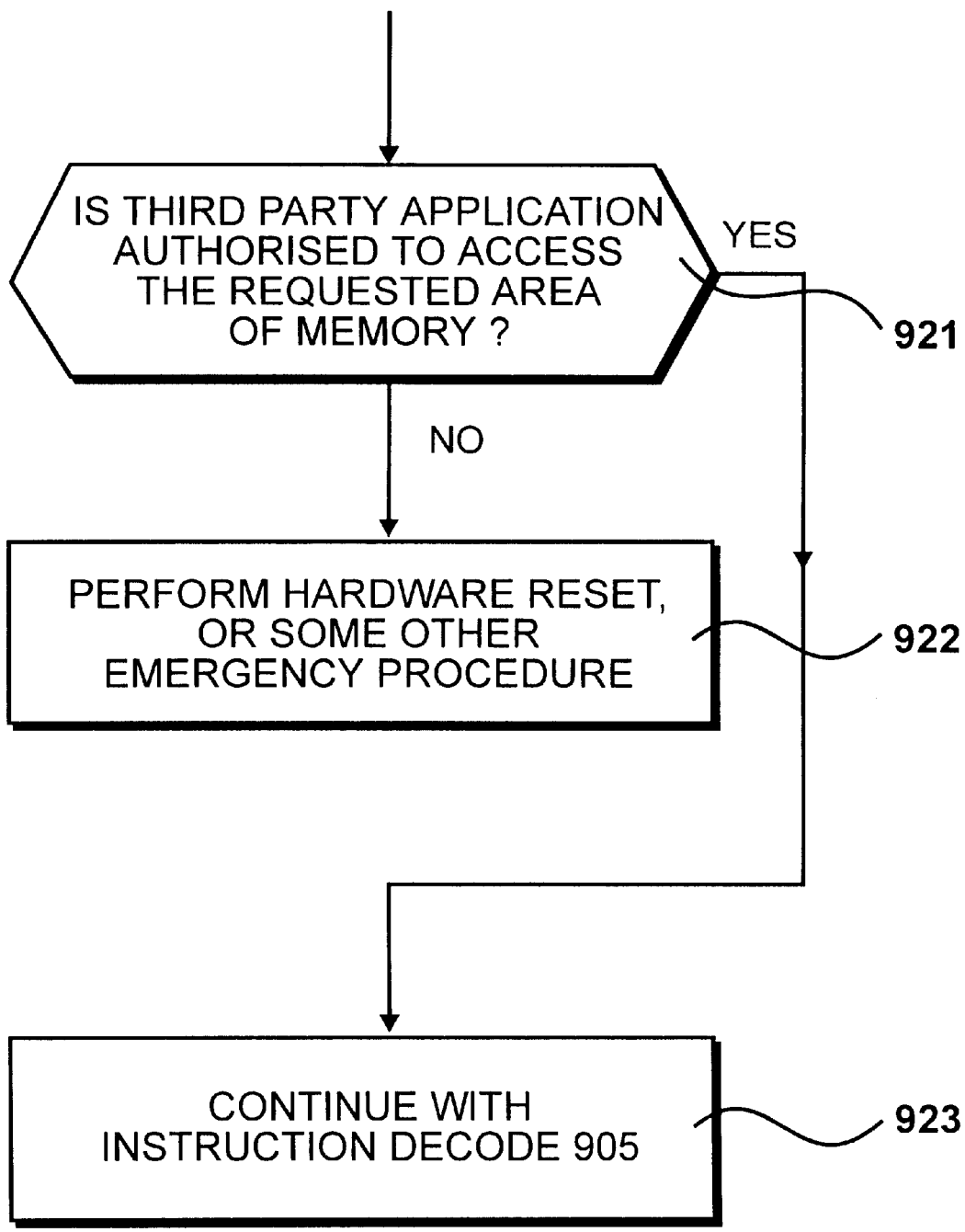

Thus, when an application attempts to change a page register using a protected instruction, the central processing unit 701 automatically forces a jump to an exception handling instruction sequence which is stored in the privileged instruction memory 702. This instruction sequence is summarised in FIG. 9b. In process 921 a question is asked as to whether the third party application is authorised to access the requested area of memory. This question typically involves a sequence of conditional instructions being executed in response to a series of comparisons between data stored in either of the data memories 704 or 705. It should be noted that data for these comparisons should at least partly be held in pages to which the third party application does not have access, thereby preventing any form of unwarranted access.

If the instruction is authorised, the operating system executes the instruction itself, via process 923, whereafter control is returned to the third party application program. Alternatively, the exception handler does not authorise the request. This indicates either an error condition, or a deliberate attempt to break into a restricted area of memory. In process 922 the chip may be reset, or some other emergency procedure performed, such as clearing of any non-encrypted data in the volatile memory area 705.

The set of instructions executable by the central processing unit 701 is shown in FIG. 10. Protected instructions, executable only from privileged instruction memory 702, are shown in FIG. 10. These include RST, reset, which resets the chip. When performed as part of an exception handling routine, as shown in FIG. 9a, this has the effect of disabling the third party application instructions, and initialising hardware circuits to those conditions which would otherwise be encountered only after power has been initially applied to the smart card. The first instructions to be fetched and executed will be those starting at address zero in the privileged instruction memory 702.

Other protected instructions include instructions to read or write page registers. SETPG MS allows the contents of the page register 717 to be defined. In the terminology adopted for the mnemonics, MS stands for module space, meaning the non-volatile instruction memory 703, in which third party applications, or modules, are stored. Binary Interface Space is the terminology used to describe the privileged instruction memory 702, in which operating system or interface instructions are stored. Additional protected instructions include those which allow the central processing unit to write to the non-volatile instruction memory 703, known in the terminology of the mnemonics as module space. Thus, only the operating system is able to load applications. It is also able to erase them when they are no longer wanted, to make way for an update or a different third party application.

Non-protected instructions are listed in FIGS. 10b and 10c. These include instructions used for binary arithmetic, such as adding to an accumulator, subtracting from an accumulator and so on, and instructions which may modify certain offset registers.

In addition to preventing unwarranted interference from third party applications, the invention prevents unwarranted corruption of one third party application by another. The invention thereby provides a secure mechanism for multi-application support in hardware. This also simplifies third party application development: instead of having every application to trust any other application to behave correctly with respect to secure data, it is only necessary to rely on the hardware protection mechanism, which will have been subject to many tests and can form the basis for many future product variants.

Although the preferred embodiment stores third party applications in non-volatile memory, the invention provides similar advantages when used for volatile memory, for example when multiple applications are loaded during a single session.

Figure 11:
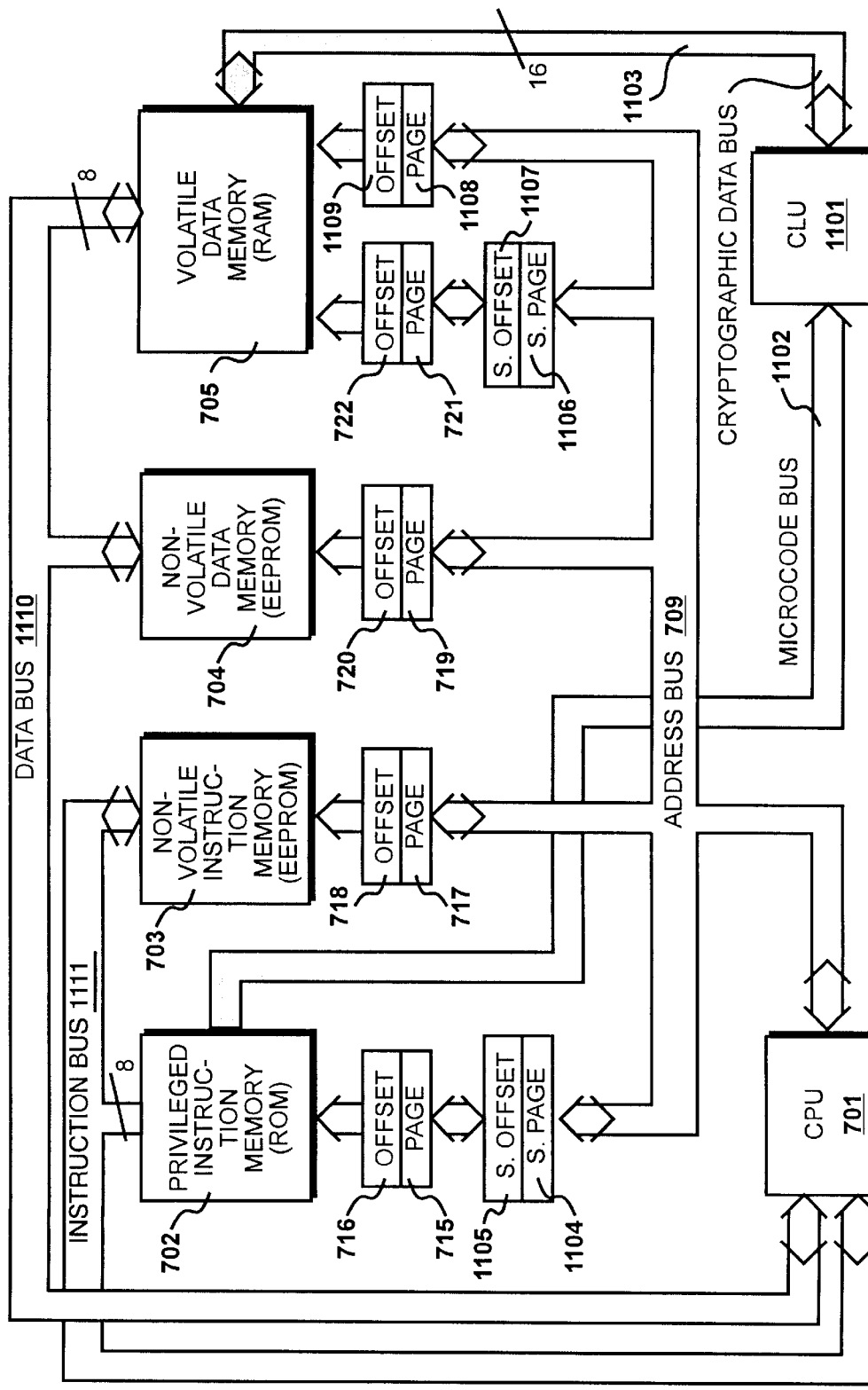
FIG. 11 details a preferred embodiment of the invention, including a cryptographic logic unit, connected to a privileged instruction memory by a microcode bus.

In the preferred embodiment, the smart card chip includes additional circuitry primarily aimed at improving the efficiency and speed of performing encryption and decryption. Furthermore, the implementation of the central processing unit, memories and instruction sequencing logic are implemented in accordance with the methodology known as reduced instruction set computer (RISC). Features of the preferred embodiment are shown in FIG. 11. The major difference between this and the arrangement shown in FIG. 7a, is the addition of a cryptographic logic unit (CLU) 1101.

In addition to the cryptographic logic unit 1101, additional page and offset registers 1104, 1105, 1106, 1107, 1108 and 1109 are provided to speed up certain types of memory operations. The page and offset register pair 1104 and 1105 are used to provide fast context switching for subroutines executed from within the privileged instruction memory 702. When a subroutine is called, a new instruction memory address is generated from the subroutine address register pair 1104 and 1105, while the return address from the subroutine is maintained in the original address register pair 715 and 716. A corresponding pair of registers 1106 and 1107 is used to provide fast context switching for data when a subroutine is called. Thus, when a subroutine is called from within privileged instruction memory, both instructions and data have an immediate change of context, which may be reversed on the return from the subroutine instructions.

The volatile data memory 705 also includes a further additional address register pair, 1108 and 1109. These facilitate fast block data transfers between locations within the same area of the volatile data memory 705. This is the only area of memory with sufficiently fast write cycle times to make it worth implementing the extra pair of address registers.

Instructions from the privileged instruction memory 702 or the non-volatile instruction memory 703 are supplied to the central processing unit 701 over an instruction bus 1111. Data from the non-volatile data memory 704 or the volatile data memory 705 are supplied to the central processing unit 701 over a separate data bus 1110. This arrangement permits an instruction fetch cycle to be performed simultaneously with a data read or write cycle, thus speeding up operations. This arrangement is generally referred to as Harvard Architecture.

The four memories 702, 703, 704 and 705 are all able to perform a read operation within fifty nanoseconds. A one hundred and twenty eight bit cache is used to ensure this speed of access can be maintained most of the time, alternatively, if a read operation is required from a location which is not currently stored in the cache, a wait state is inserted automatically.

The volatile data memory 705 is also able to perform a write operation. The central processing unit is arranged to execute instructions in a single clock cycle, wherein said clock cycle has a minimum time of fifty nanoseconds. Thus, the central processing unit and the memories are able to operate synchronously at an instruction rate of twenty million instructions per second (MIPS).

Public key cryptography systems are used extensively in financial transactions, and their widespread use is anticipated in smart cards. A difficulty with known public key cryptosystems, such as RSA, is the requirement for long multiplication of large integers, having two hundred and fifty-six, five hundred and twelve or more binary digits. Even when using a central processing unit running at twenty million instructions per second, highly secure public key cryptosystems may require several seconds to perform a single encrypted transaction. A typical financial transaction may require ten complete encrypted message transfers, theoretically requiring over a minute of processing time using existing technology. This presents a major barrier to the widespread adoption of smart cards. For example, if a smart card is to be used to pay for a ticket on public transport, for example a bus, pausing for tens of seconds for each person in a long queue may be considered unacceptable.

Research into cryptography is accelerating, due to the simultaneous increased demand for electronic money and the availability of processing power which may be used to break cryptographic codes. However, proposed cryptographic systems which provide the level of security required for widespread adoption of smart cards as a replacement for printed currency, require a level of processing power not available in standard low cost microcontroller architectures such as 8051, 6805 or similar devices. The ability to perform public key decryption and encryption according to protocols such as RSA, DSS and CAFE in a reasonable time is considered essential for an effective smart card design.

The cryptographic logic unit 1101, shown in FIG. 11, is used to speed up the process of performing public key cryptographic transactions, and can multiply binary numbers having up to six hundred and forty bits. There are, however, several technical difficulties which need to be overcome if such a device is to be integrated into a reasonably small area of silicon. The first major problem is one of speed. Components of the cryptographic logic unit 1101 may be operated at a high instruction rate of sixty million instructions per second. However, supplying enough instructions to the cryptographic logic unit 1101 to enable it to execute a new instruction on every one of its clock cycles represents a considerable technical challenge.

Firstly, there is no room on the chip for a memory area dedicated to storing and supplying instructions for the cryptographic logic unit 1101. But the privileged instruction memory 702 has an access time of fifty nanoseconds, which is three times less than the instruction rate. In FIG. 11, a thirty-two bit wide microcode bus supplies instructions from the privileged instruction memory 702 to the cryptographic logic unit 1101 at the maximum memory read rate of twenty million read cycles per second. While instructions are supplied from the privileged instruction memory to the microcode bus, instructions cannot be simultaneously supplied to the central processing unit. It is therefore possible to share various hardware components involved in the sequencing of instructions, and thereby reduce the area of silicon required.

Figure 12:
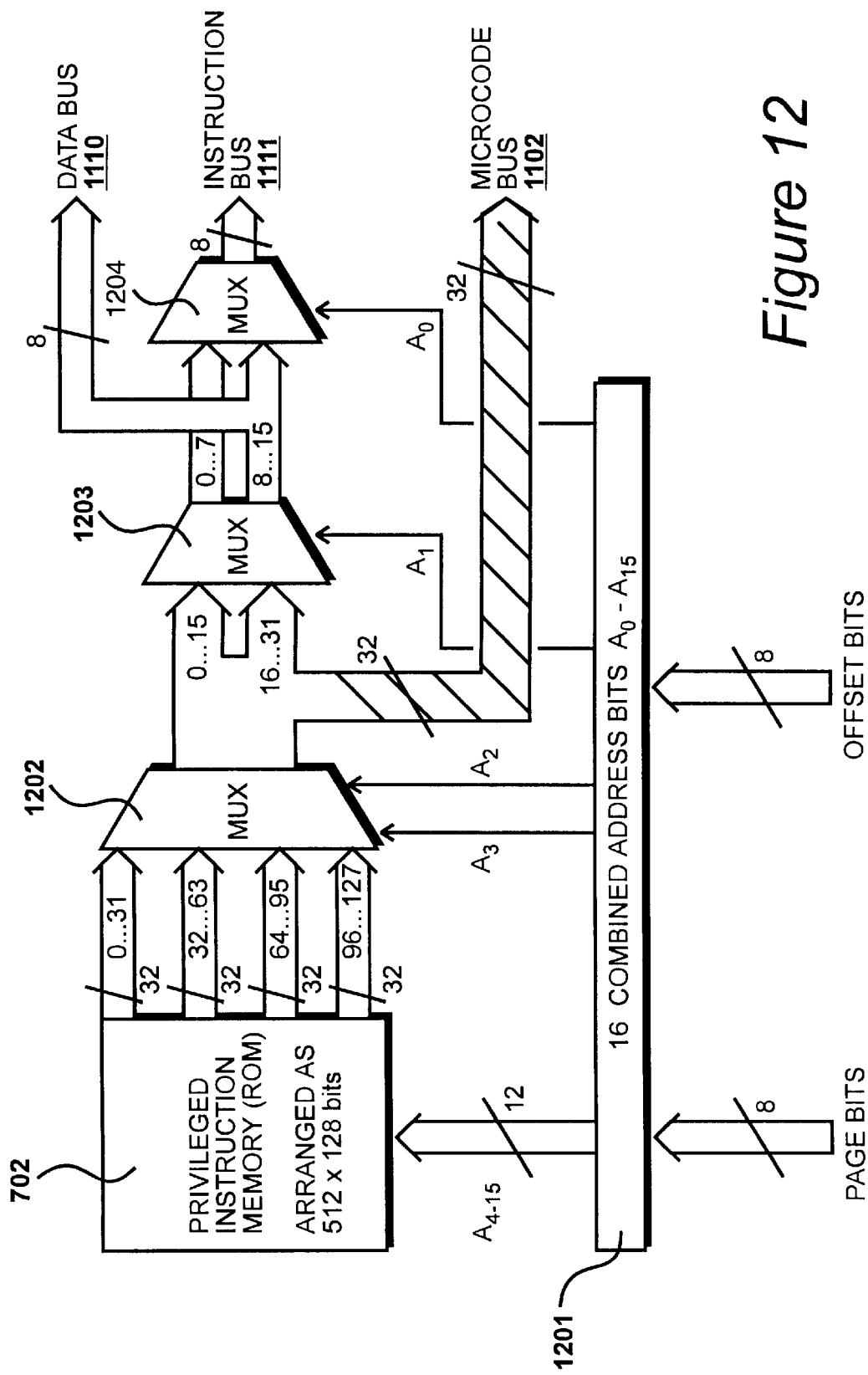
FIG. 12 details multiplexing arrangements for supplying instructions from the privileged instruction memory shown in FIG. 11 to the microcode bus.

Connections from the privileged instruction memory 702 to the microcode bus 1102 shown in FIG. 11 are detailed in FIG. 12. Page bits and offset bits from either registers 715 and 716 or registers 1104 and 1105 may be considered as forming a sixteen bit address word 1201, comprising individual address lines labelled A0 through to A15. The most significant twelve of these sixteen bits, A4 to A15, are supplied as an address to the privileged instruction memory 702, which is arranged as five hundred and twelve locations, each having one hundred and twenty-eight data bits. Only nine of the address lines, A4 to A12 are needed to access the five hundred and twelve locations, so A13 to A15 are left unconnected. Subsequent designs may easily be configured to hold larger amounts of memory simply by connecting these unused address lines to a larger read-only memory array.

The data from each location in the privileged instruction memory is considered as comprising four lots of thirty-two bit data words, thus forming a type of cache, which are fed to a four way multiplexer 1202. One of these four words is then selected as the output of the multiplexer 1202, according to the two address lines A3 and A2 which are supplied to it. In this way, a thirty-two bit data word may be selected with an access time of fifty nanoseconds, provided the thirty two bit word was already available within the one hundred and twenty-eight bit memory array output. If this is not the case, memory control logic circuits automatically insert a wait state into the instruction fetch cycle, such that a different one hundred and twenty-eight bit word may be fetched, which contains the desired thirty-two bit word.

This thirty two bit data word may be supplied directly as the microcode bus 1102, when the cryptographic logic unit 1101 is operating. Alternatively, when fetching instructions for the central processing unit 701, the thirty-two bit output from multiplexer 1202 is supplied to another multiplexer 1203 as a pair of sixteen bit words, selected by address line A1. The selected sixteen bit output from multiplexer 1203 is further sub-divided into a pair of eight bit words, or bytes, which are supplied to a third multiplexer 1204. The output of multiplexer 1204 is selected by the least significant address line, A0, and supplies instruction data to the instruction bus 1111 a byte at a time, at a rate of twenty million instructions per second. The most significant eight bits of the sixteen bit output from the second multiplexer 1203 are also available to supply data to the data bus 1110. This connection is not shown in FIG. 11, for reasons of legibility. The purpose of this arrangement is to ensure that certain multibyte instructions, for example in which an immediate data value is specified as part of the instruction, may also be executed at the maximum instruction rate of twenty million instructions per second.

Figure 13A:
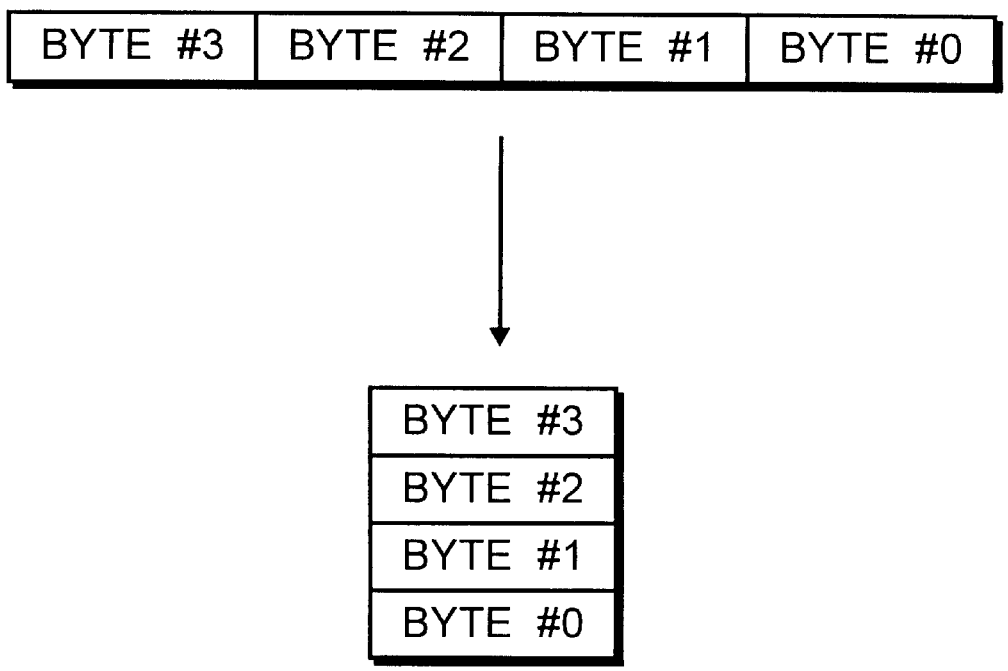
FIG. 13a details temporal reordering of a thirty-two bit microcode received by the cryptographic logic unit shown in FIG. 11, including individual instruction bytes.

Instructions supplied to the cryptographic logic unit 1101 are therefore supplied as thirty-two bit words. The treatment of these words is detailed in FIG. 13a, FIG. 13b and FIG. 13c. In FIG. 13a, the thirty-two bit microcode is shown as comprising four bytes. These four bytes may change at a rate of twenty million times a second, which is only a third of the instruction rate of the cryptographic logic unit 1101. Thus each byte is considered as an instruction, and the bytes are selected sequentially at the higher instruction rate of sixty MIPS.

Figure 13B:
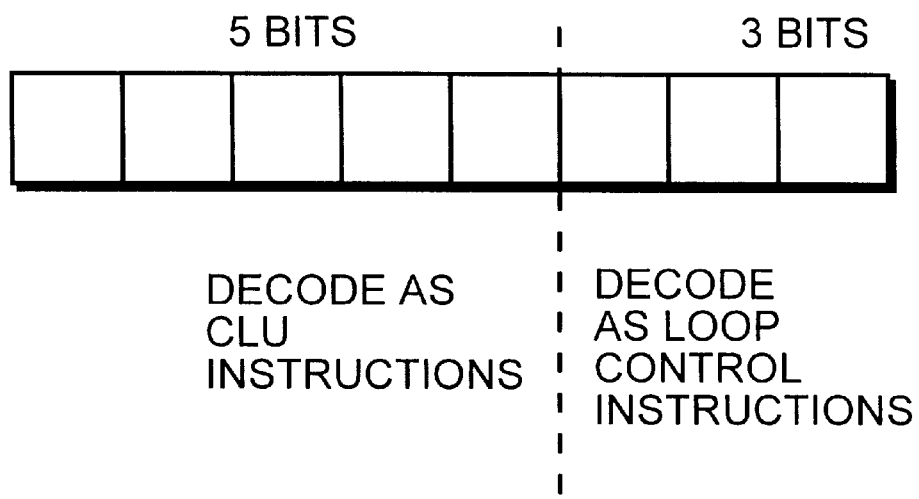
FIG. 13b details decoding protocols for the bytes shown in FIG. 13a, including a five bit instruction word.

Each byte comprises two parts, shown in FIG. 13b. The eight bits usually define an operation in the cryptographic logic unit 1101. However, three bits may be used to define a two dimensional hardware looping counter. Thus when the three bit combination has the binary value 101, the value in the remaining five bits is used to define the outer loop count for a two dimensional hardware loop counter. If the three bits have the value 111, the other five bits define the inner loop count for the two dimensional hardware loop counter. Other combinations of the three bits enable all eight to be considered as defining a particular operation instruction for the cryptographic logic unit 1101.

Thus a two dimensional loop structure is provided, such that an inner loop may comprise instructions to be executed n times, with an outer loop comprising groups of instructions, including inner loop instructions, to be executed m times. Thus, inner loop instructions are executed a total of (n.m) times.

The importance of looping can be seen when the instruction rate is considered. If bytes are removed from the memory at a rate of sixty million per second, the length of a microcode sequence could easily consume valuable memory space. By providing two dimensional hardware looping, memory space is conserved by reducing instruction redundancy.

Figure 13C:
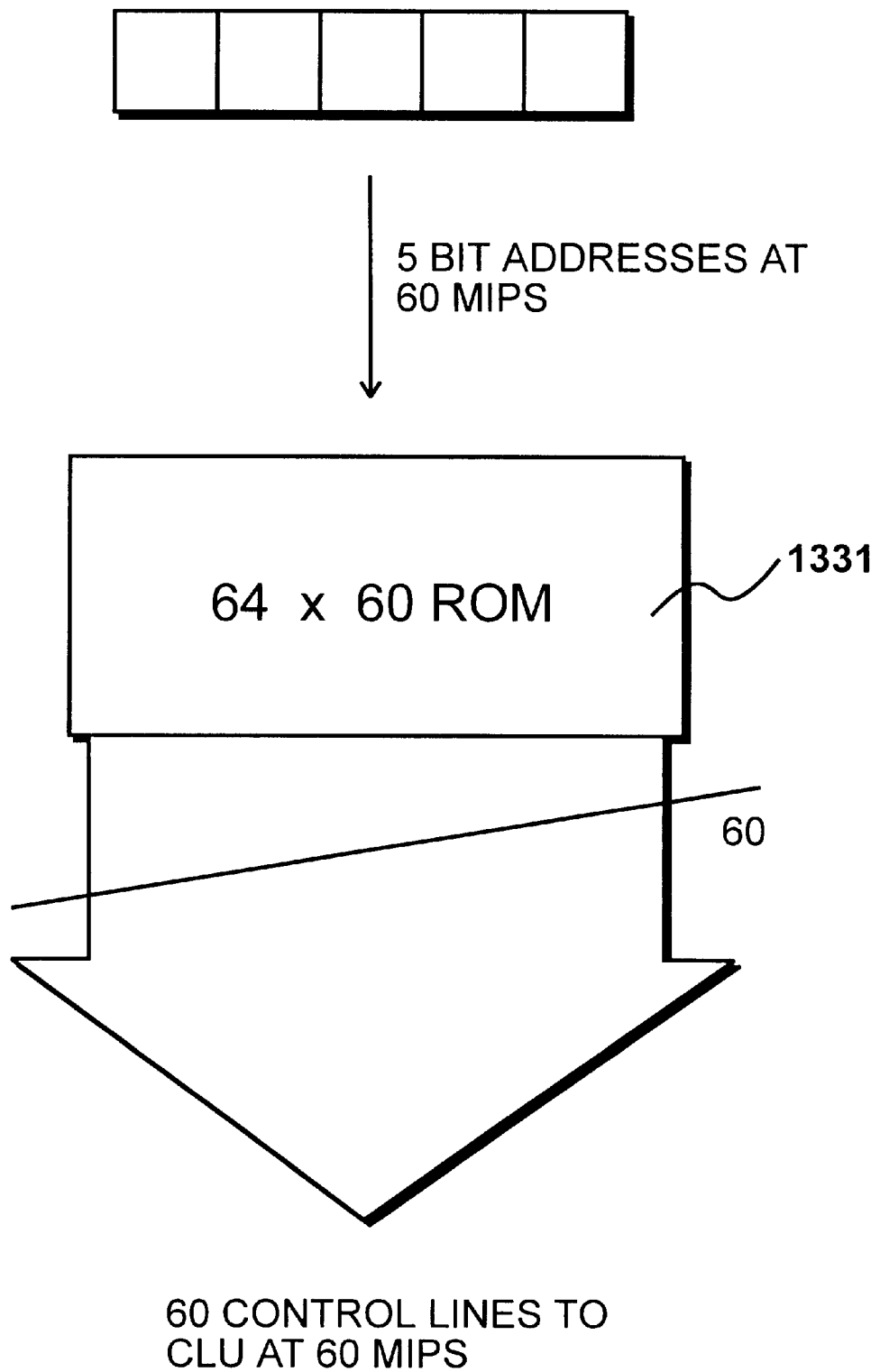
FIG. 13c details decoding logic of the five bit instruction word shown in FIG. 13b.

The cryptographic logic unit 1101 comprises a number of complex circuit elements, each of which requires control by an electrical signal in order to define its operation. The eight bits which define a cryptographic operation are therefore decoded, as shown in FIG. 13c. A sixty-four location read-only memory 1331 contains sixty data bits in each of its memory locations. Thus sixty-four possible combinations of sixty control lines may be defined. In this way, the cryptographic logic unit 1101 has all sixty of its control lines updated at a rate of sixty million times per second.

Referring once more to the arrangement shown in FIG. 11, the cryptographic logic unit 1101 also has a dedicated sixteen bit cryptographic data bus 1103, over which data may be supplied to or from the non-volatile data memory 705. A multiplexing arrangement analogous to that shown in FIG. 12 is used to provide high speed sixty access to the otherwise comparatively slow volatile data memory 705. The major difference is that the data multiplexing arrangement is bidirectional, whereas instructions are never written from the cryptographic logic unit 1101 to the privileged instruction memory 702.

Instructions are supplied from the privileged instruction memory 702 to the central processing unit 701 or the cryptographic logic unit 1101. Immediately after power is applied, or a reset condition, the first instruction is executed from the privileged instruction memory 702. When it is necessary to perform data processing using the cryptographic logic unit 1101, a special command, known by the mnemonic SPAS, is issued to the central processing unit 701, which then co-ordinates circuitry to enable instructions to be supplied directly to the cryptographic logic unit 1101 thereafter. Instructions following SPAS will be decoded as indicated in FIG. 13a, FIG. 13b and FIG. 13c. One of the instructions which may be supplied to the cryptographic logic unit 1101 signifies an end of the cryptographic instruction sequence. The cryptographic logic unit 1101 then sets an interrupt control line, resulting in a return of control to the central processing unit 701, with subsequent instruction bytes supplied and decoded therein.

The design of the cryptographic logic unit 1101 is such that, although data manipulation is performed using registers having dynamic memory elements, intermediate results will not lose their validity if left for longer than the decay time of one of said dynamic memory elements, which is in the order of a millisecond or two. Furthermore, the registers contained in the cryptographic logic unit include addressless shift registers, thereby reducing the number of control lines required to define an operation. Address-less registers facilitate high speed operation using a reduced area of silicon. The address-less registers can perform multi-dimensional bit transfers in accordance with the requirements of various data encryption procedures. Thus, shift registers in the cryptographic logic unit overlap and intersect the processing registers to cope with high performance multi-dimensional pipelining. This method allows bit oriented processing, while the general operation is on a word basis.

The method of supplying instructions to the cryptographic logic unit is highly versatile, as the particular calculations which it performs are divided up into several discrete logical steps defined as instructions in the privileged instruction memory 702. Thus, should it be necessary to define improved functionality, different instructions may be provided, rather than a redesign of the cryptographic logic unit.

As is known, it is highly desirable to keep the area of silicon required to implement a particular circuit to the minimum. Larger chips have a lower manufacturing yield, and therefore a disproportionately higher cost. Furthermore, when used in smart cards, larger chips are more prone to failure in the field.

A problem with operating the cryptographic logic unit at such a high instruction rate, is the requirement for a high speed oscillator. Clock signals are typically supplied to a smart card, having frequencies in the order of three megahertz. Supplying a sixty megahertz signal via a smart card terminal is impractical, due to the deterioration in quality of such a high frequency clock signal over only a few centimeters of connecting wire. A quartz crystal is too large too fit into the physical restrictions imposed by accepted international smart card standards, and would also be expensive.

Figure 14:
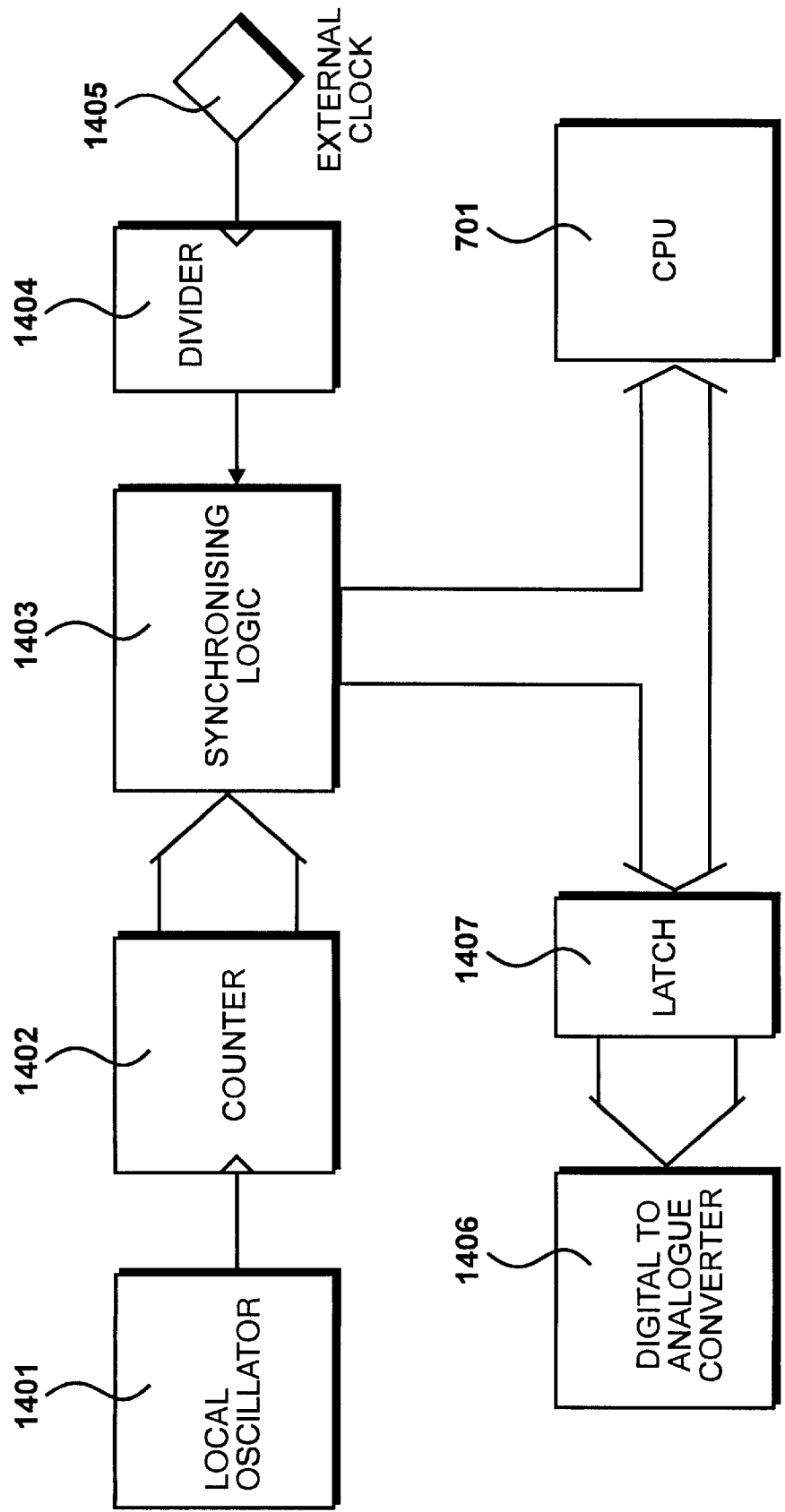
FIG. 14 shows clock circuitry arranged to generate a high frequency clock signal for the cryptographic logic unit shown in FIG. 11.

A solution is shown in FIG. 14. A local oscillator 1401 on the chip oscillates within a known range of frequencies, and can be made to oscillate at sixty megahertz by application of an analogue correction signal 1408. The output from the local oscillator 1401 is supplied to a counter 1402, having a multi-bit output which increments on each cycle of the local oscillator. A three megahertz external clock is supplied to the smart card chip via a clock terminal 1405. This signal is supplied to a divider 1404, which generates an output frequency of which the external clock is an integer multiple.

The frequency output from the divider 1404 and the count value from the counter are supplied to synchronising logic 1403, which samples the output of the counter 1402 once for each clock cycle supplied from the divider 1404. This sample is then supplied to the central processing unit 701, which calculates a frequency correction factor in accordance with known properties of the circuit. The frequency correction factor is supplied to a latch 1407, whose output is supplied to a digital to analogue converter 1406. The digital to analogue converter 1406 is not complex, as the settling time of its output does not have to be short. The output of the digital to analogue converter 1406 is supplied to the local oscillator 1401, which then oscillates at a frequency substantially closer to sixty megahertz. Further iterations of this loop process may be performed as a method of achieving higher accuracy, or compensating for temperature drift if the card is to be powered for an extended period of time. The sixty megahertz clock is subdivided by three in order to provide a twenty megahertz clock for circuitry other than the cryptographic logic unit 1101. It should be noted that the value supplied to the digital to analogue converter 1406 is supplied by an instruction which is only executable from the privileged instruction memory 702.

In order to conserve power, the central processing unit 701 may control an I/O register on the chip, such that the sixty megahertz clock is prevented from clocking circuits in the cryptographic logic unit 1101.

An additional component, not shown in FIG. 11 for reasons of clarity, is a noise source. Several cryptographic procedures benefit from seeding algorithms with a genuinely random value, as opposed to a pseudo random value generated digitally using shift registers and gates. Thus, in a preferred embodiment, a physical noise source is integrated onto the same chip die as the rest of the circuitry that has already been described.

The invention provides improved security for many smart card applications, along with high processing power from a relatively small area of silicon. Such a device has a wide range of applications. These include: Secure access to information over an insecure network, such as the internet, without exposing security keys. Point to point encryption of voice conversations, fax messages or modem tones. Securing data on removable hard disk drives.

We claim:

1. A single chip integrated circuit comprising an integrated circuit on a single chip having processing means arranged to process instructions supplied from storage means, characterized in that said storage means comprises a first storage region and a second storage region;

first instructions are selectively supplied to said processing means from said first storage region and said second region; and enabling means are arranged to enable said processing means to be responsive to privileged instructions if said first instructions are received from said first storage region, and to disable said processing means from being responsive to said privileged instructions if said first instructions are received from said second storage region.

2. A circuit according to claim 1, wherein said single chip is encapsulated in a smart card and said second instruction storage region is configurable to receive instructions from a smart card terminal.

3. A single chip integrated circuit having processing means arranged to process instructions supplied from storage means, characterized in that said storage means comprises a first storage region and a second storage region;

first instructions are selectively supplied to said processing means from said first storage region and said second region; and enabling means are arranged to enable said processing means to be responsive to privileged instructions if said first instructions are received from said first storage region, and to disable said processing means from being responsive to said p rivileged instructions if said first instructions are received from said second storage region, including paged addressing means arranged to supply addresses to an instruction storage region, wherein said paged addressing means is changeable only by protected instructions supplied from said first storage region.

4. A single chip integrated circuit having processing means arranged to process instructions supplied from storage means, characterized in that said storage means comprises a first storage region and a second storage region;

first instructions are selectively supplied to said processing means from said first storage region and said second region; and enabling means are arranged to enable said processing means to be responsive to privileged instructions if said first instructions are received from said first storage region, and to disable said processing means from being responsive to said privileged instructions if said first instructions are received from said second storage region, having a plurality of processing means wherein said first storage region includes multiplexing means arranged to select destination processing means for receiving instructions.

5. A circuit according to claim 4, wherein a first destination processing means is arranged to receive and decode instructions from said first storage region at a first instruction rate and a second destination processing means as arranged to receive and decode instructions from said first storage region at a second instruction rate.

6. A method of processing instructions read from storage means, characterized in that said storage means comprises a single chip integrated circuit having first storage region and a second storage region;

first instructions are selectively supplied to a processing means from said storage regions; and enabling means are arranged to enable said processing means to be responsive to privileged instructions if said first instructions are received from said first storage region, and said enabling means are arranged to disable said processing means from being responsive to said privileged instructions if said first instructions are received from said second storage region.

7. A method of processing instructions read from storage means, characterized in that said storage means comprises first storage region and a second storage region;

first instructions are selectively supplied to a processing means from said storage regions; and enabling means are arranged to enable said processing means to be responsive to privileged instructions if said first instructions are received from said first storage region, and said enabling means are arranged to disable said processing means from being responsive to said privileged instructions if said first instructions are received from said second storage region, wherein regions of memory are divided into addressable pages and pace selection is controlled in response to instructions from said first storage region.

8. A method according to claim 7, wherein said processing means is configured to select a source of instructions and protected instructions are prevented from being executed.

9. A method of processing instructions read from storage means, characterized in that said storage means comprises first storage region and a second storage region;

first instructions are selectively supplied to a processing means from said storage regions; and enabling means are arranged to enable said processing means to be responsive to privileged instructions if said first instructions are received from said first storage region, and said enabling means are arranged to disable said processing means from being responsive to said privileged instructions if said first instructions are received from said second storage region, wherein said processing means is configured to select a source of instructions and protected instructions are prevented from being executed, wherein said protected instructions are selectively prevented from being executed in response to a control signal from decoding means.

10. A method according to claim 9 wherein a processing means is a cryptographic processing means.

* * * * *